Figure 1:
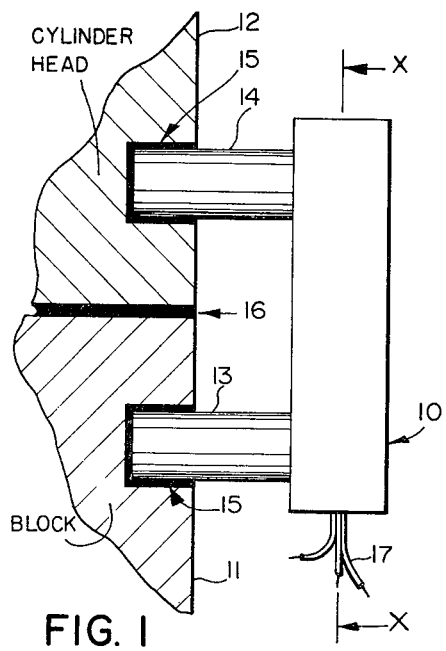

United States Patent
Heggie

[11] 3,939,703
[45] Feb. 24, 1976

[54] APPARATUS FOR MEASURING ENGINE CYLINDER PRESSURES

[75] Inventor: William S. Heggie, Ottawa, Canada

[73] Assignee: Canadian Patents & Development Limited, Ottawa, Canada

[22] Filed: Sept. 16, 1974

[21] Appl. No.: 506,094

[52] U.S. Cl. ............................................. 73/115
[51] Int. Cl.² ....................................... G01M 15/00
[58] Field of Search......... 73/116, 118, 115, 88.5 R, 73/119 R, 49.7, 49.8, 37.5; 116/114 AE; 277/2

[56] References Cited
UNITED STATES PATENTS

| | | | |
|---|---|---|---|
| 2,569,949 | 10/1951 | Prescott | 73/88.5 X |
| 3,690,162 | 9/1972 | Stecker | 73/119 R |

*Primary Examiner*—Jerry W. Myracle
*Attorney, Agent, or Firm*—James R. Hughes

[57] ABSTRACT

Apparatus for measuring engine cylinder pressures having an arcuate metal strip, means for mounting the strip at one end to the engine block and at the other to the engine head such that the strip spans the engine head gasket and strains in the gasket cause bowing of the metal strip, and a transducer mounted on the strip for measuring the amount of bowing of the strip and providing an output signal related to this. A preferred means for mounting the strip is metal dowels attached to the end of the strip and rigidly mounted in openings in the cylinder head and block and the preferred transducer comprises a pair of resistance element strain gauges mounted on the inside and the outside of the arcuate portion of the metal strip.

3 Claims, 4 Drawing Figures

U.S. Patent  Feb. 24, 1976  3,939,703

APPARATUS FOR MEASURING ENGINE CYLINDER PRESSURES

This invention relates to apparatus for monitoring engine cylinder pressures and more particularly to a transducer for obtaining a reciprocating engine cylinder time pressure history that records machine component dynamic strain.

Of the various parameters which may be monitored on a reciprocating engine, cylinder pressure-time history may be considered the most important. The pressure-time diagram provides much complete information of its own in addition to that which compares information derived from other monitoring devices.

It is realized that all engine functions produce characteristics stresses in the machine hardware and the problem of producing cylinder pressure-time history is that of choosing the best accessible sensing point and providing apparatus that will produce readings that are accurate and analyzable. There are several ways that dynamic strain measurements may be made, for example, for measuring the stresses in cylinder head bolts, crankcase wall structures, or cylinder head gaskets.

It has been found that strain in cylinder head gaskets provide the best approach. Maximum strain levels (e.g. some 800 microinches per inch under test consitions) provide a robust signal and good fatigue life. Transducers may be readily located at any accessible point around the cylinder head periphery and varying characteristics available at different locations are a distinct advantage particularly in that strain levels increase toward cylinder centers (highest between pairs of bolts).

Figure 3:
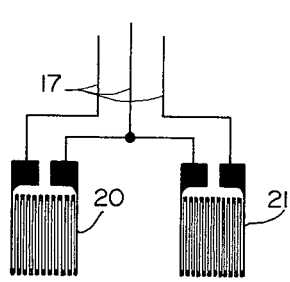
Figure 2:
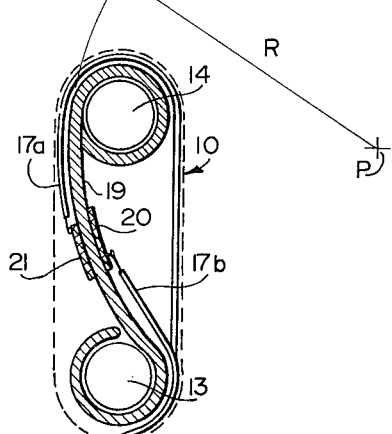
Figure 4:
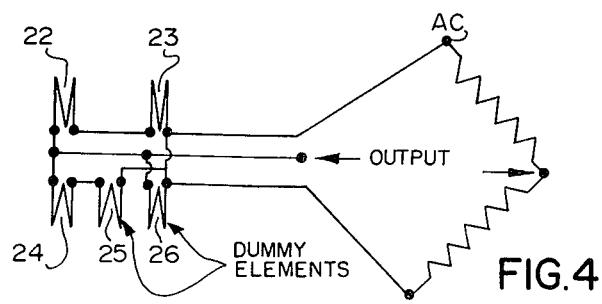

In drawings which illustrate an embodiment of the invention,

FIG. 1 is a cross-section, partly schematic of the transducer and mounting on an engine, FIG. 2 is a cross-section on X—X of the transducer, FIG. 3 shows the tow resistance element, and FIG. 4 is a possible electrical measuring and output arrangement.

Referring to FIG. 1, the transducer 10 is mounted between engine block 11 and cylinder head 12 on two metal (preferably steel) rods or dowels 13 and 14 rigidly fixed into openings in the head and block. This may be conveniently done by using epoxy glue 15. The transducer spans gasket 16 and strains in it are translated into relative motion between the dowels 13 and 14 and this is measured in transducer 10 and converted to an electrical output apearing on leads 17.

FIG. 2 shows how this measurement is made. A strong metal (preferably steel) member 19 interconnects dowels 13 and 14 and has a circular shape over its operating portion with its end turned to encircle and grip the dowels. The circular shape is an arc on radius R from point P. These are chosen to give best results although the length and position of these can be varied quite widely. Poor or no results are obtained if the operating length of member 19 is straight or close to straight. Two resistance element strain gauges 20 and 21 are rigidly attached, preferably by epoxy, one on each side of the operating length of member 19. Relative motion between the dowels results in flexure of the member 19 and this is measured by the resistance elements. Leads 17a and 17b pass to the exterior and the complete transducer is encapsulated in epoxy resin glue to form transducer housing 10 and to provide damping to member 19 and the resistance elements.

FIG. 3 illustrates the transducer resistance elements 17a and 17b and FIG. 4 is a circuit diagram of a bridge measuring circuit that may be used for providing a readout to a meter, strip chart recorder, oscilloscope etc. This is an AC bridge and the set-up shown provides measurement of three cylinders at once from transducers 22, 23, and 24. During elements 25 and 26 are required for proper operation of the bridge.

Although the invention described above is not capable of producing a signature identical to that available with a diaphram in contact with the fluid, it will provide one sufficiently representative to constitute an equally useful diagnostic tool. Low cost, long life and ease of installation without major engine modification provide economic viability. In the area of road transportation fleet maintenance may be greatly facilitated by using the technique described as a simple clinical type analyzer. The area of greatest advantage however is considered to be in large equipment such as power-plant and diesel locomotive railway operations, where a complete data acquisition system is possible to individual units and/or plants.

I claim:

1. Apparatus for measuring engine cylinder pressures comprising:
   a. an arcuate metal strip,
   b. a pair of metal dowels attached to the ends of the strip, one of said dowels rigidly mounted in an opening in the cylinder block and the other rigidly mounted in an opening in the cylinder head, and
   c. a transducer mounted on the strip for measuring the amount of bowing of the strip and providing an output signal related to this.

2. Apparatus for measuring engine cylinder pressures comprising:
   a. an arcuate metal strip,
   b. means for mounting the strip at one end to the engine block and at the other to the engine head such that the strip spans the engine head gasket and strains in the gasket cause bowing of the metal strip, and
   c. a pair of resistance element strain gauges one mounted on the inside and the other on the outside of the arcuate or bowed portion of the metal strip and connected together and to the output as to give a strong electrical output related to the amount of bowing of the strip.

3. Apparatus for measuring engine cylinder pressures comprising:
   a. an arcuate metal strip,
   b. means for mounting the strip at one end to the engine block and at the other to the engine head such that the strip spans the engine head gasket and strains in the gasket cause bowing of the metal strip,
   c. a transducer mounted on the strip for measuring the amount of bowing of the strip and providing an output signal related to this, and
   d. encapsulation material covering the strip and the transducer providing a protective housing and damping action to the strip and the transducer mounted thereon.

* * * * *